United States Patent [19]

Torneback

[11] 4,180,172
[45] Dec. 25, 1979

[54] LOAD CARRYING VEHICLE TRAILER

[76] Inventor: Axel G. Torneback, Box 12046, S-580 12 Linkoping, Sweden

[21] Appl. No.: 768,714

[22] Filed: Feb. 15, 1977

[30] Foreign Application Priority Data

Feb. 18, 1976 [SE] Sweden .................................. 7601824
Apr. 5, 1976 [SE] Sweden .................................. 7600396

[51] Int. Cl.² ............................................. B60P 1/64
[52] U.S. Cl. ..................................... 414/522; 105/393; 280/789; 296/26; 296/182
[58] Field of Search ................ 296/28 M, 1 R, 10, 26, 296/27, 100, 137 B, 138 C, 137 D, 137 E; 105/363, 370, 371, 372, 378, 393; 214/83.24; 280/789

[56] References Cited

U.S. PATENT DOCUMENTS

| 2,551,239 | 5/1951 | Bond | 296/137 B |
| 3,342,523 | 9/1967 | Lutgen | 105/393 |
| 3,540,771 | 11/1970 | Stoneburner | 296/1 R |
| 3,778,100 | 12/1973 | Dillard | 296/26 |
| 3,820,840 | 6/1974 | Forsberg | 296/137 B |

Primary Examiner—Joseph F. Peters, Jr.
Assistant Examiner—John A. Carroll
Attorney, Agent, or Firm—Neil F. Markva

[57] ABSTRACT

A load-carrying trailer of a transport vehicle has mounted therein a load platform of which a rear section is adapted to be moved slidably in the direction of the longitudinal axis of the trailer. A front section of the load platform is divided laterally into a plurality of sub-sections adapted to fold together toward the front of the trailer when the rear section moves forwardly and adapted to extend and staighten out when the rear section moves rearwardly. The load platform facilitates loading and unloading by a crane with a relatively short jib carried by a towing vehicle coupled to the front end of the trailer.

14 Claims, 6 Drawing Figures

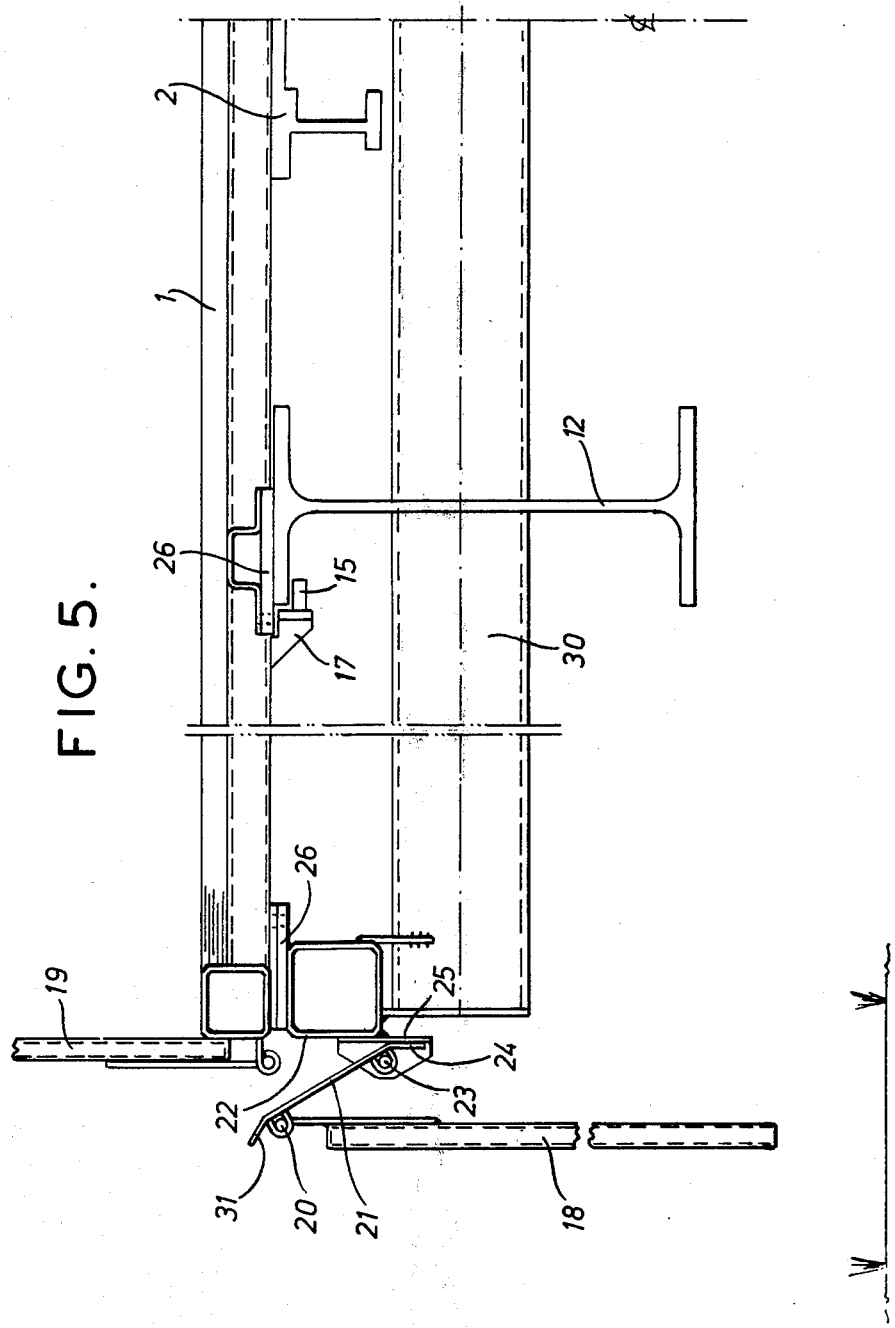

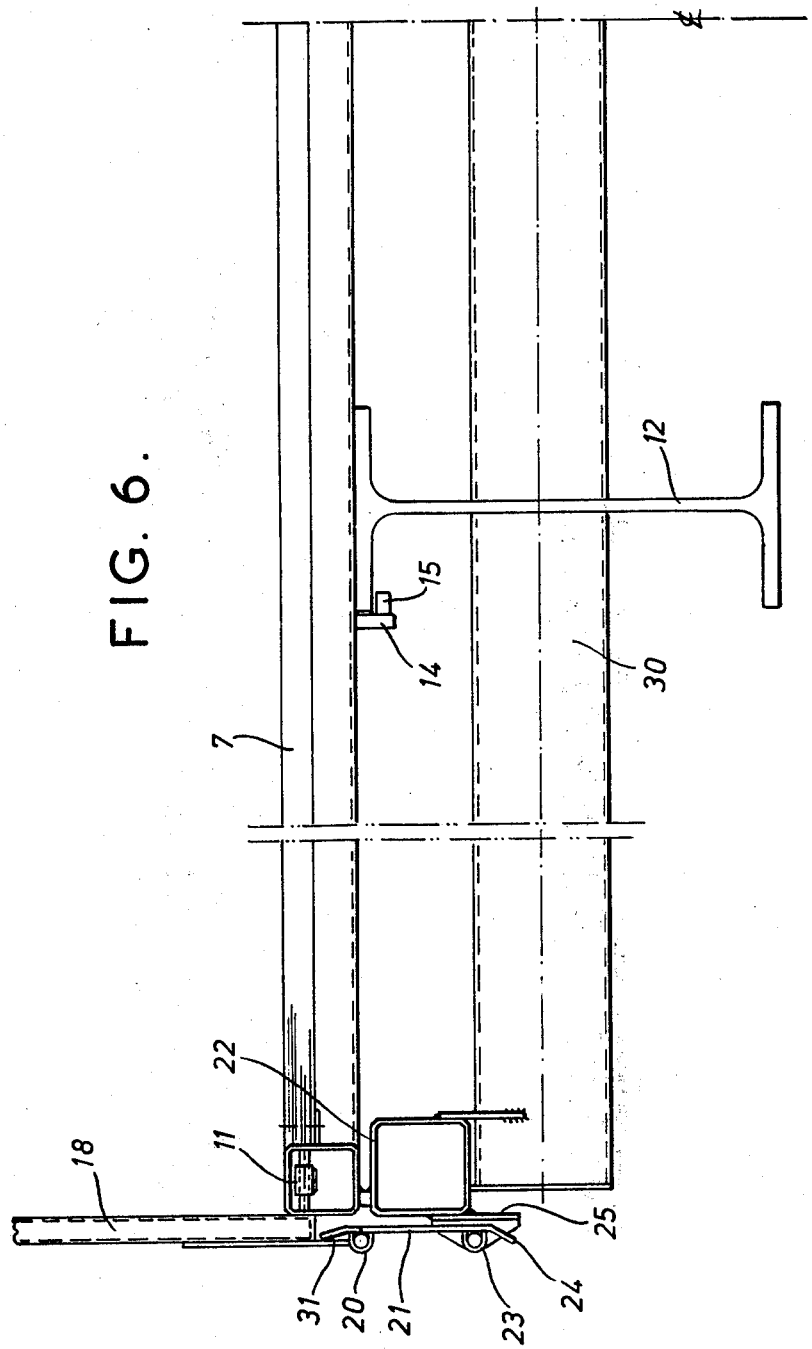

LOAD CARRYING VEHICLE TRAILER

BACKGROUND OF THE INVENTION

In the case of load-carrying transport vehicles, it is common to load or unload a draw-bar type trailer or a semitrailer (articulated trailer), hereinafter referred to as a trailer, by means of a crane mounted on the towing vehicle. If the trailer is of considerable length, the jib of the crane may be too short to reach the rear of the trailer.

In such circumstances loading of the rear part of the trailer has sometimes been carried out by disconnecting the trailer from the towing vehicle and moving the vehicle so that the crane reaches the non-loaded part. This procedure, however, leads to considerable time loss and increased operating costs.

SUMMARY OF THE INVENTION

To solve this problem, the present invention provides a load-carrying trailer structure having a unique load platform. The load platform has a rear section which slides forwardly and a front section which folds up to permit the rear section to slide forwardly.

The scope of the invention and characteristics of preferred embodiments are defined more specifically in the appended claims.

BRIEF DESCRIPTION OF DRAWINGS

The structural arrangement of preferred embodiments is further explained by the following description which refers to the accompanying drawings in which:

FIG. 5 shows a section along the line V—V on FIG. 1.

FIG. 6 shows a section along the line VI—VI on FIG. 1.

DESCRIPTION OF SPECIFIC EMBODIMENTS

Figure 1:
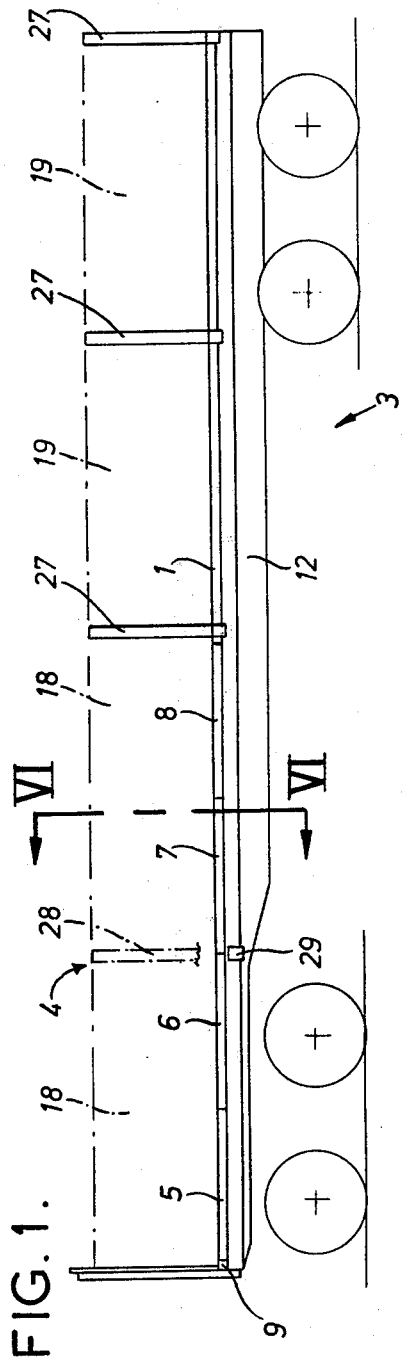
FIG. 1 shows one form of trailer in accordance with the invention, with the sliding rear load-carrying platform section in its rear position.
Figure 2:
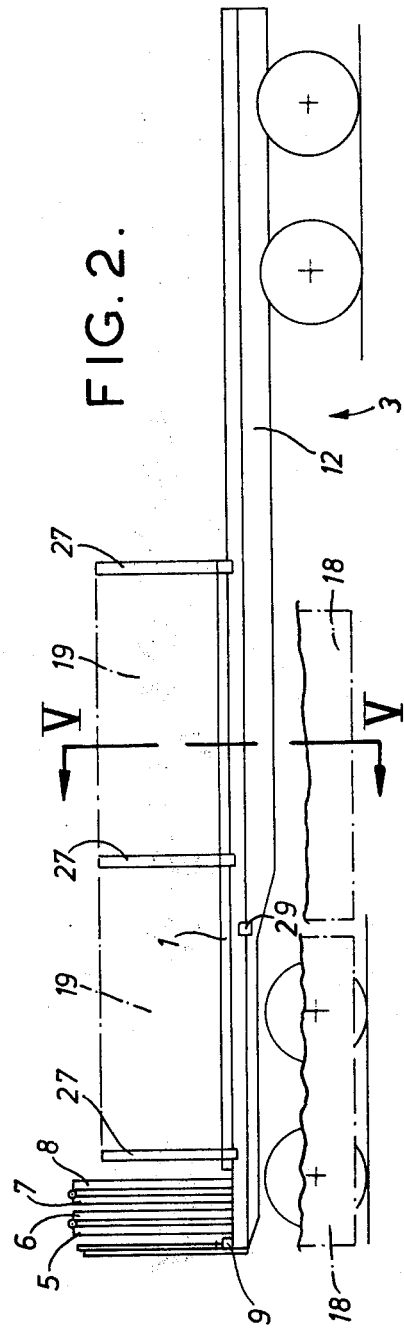
FIG. 2 shows the same trailer with the rear platform section in its forward position.
Figure 3:
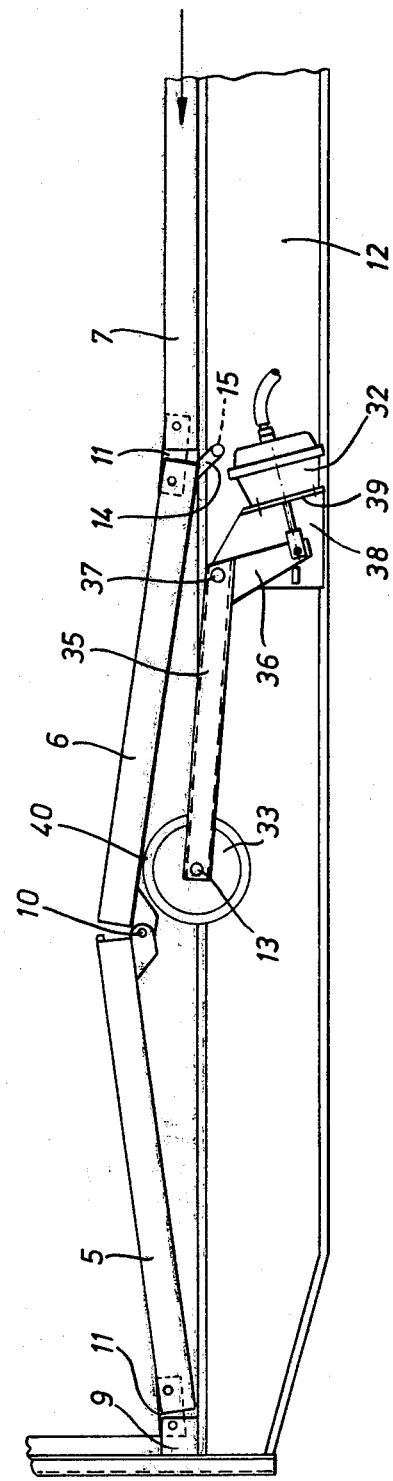
FIG. 3 shows a detail of the folding floor of the front load-carrying platform section.
Figure 4:
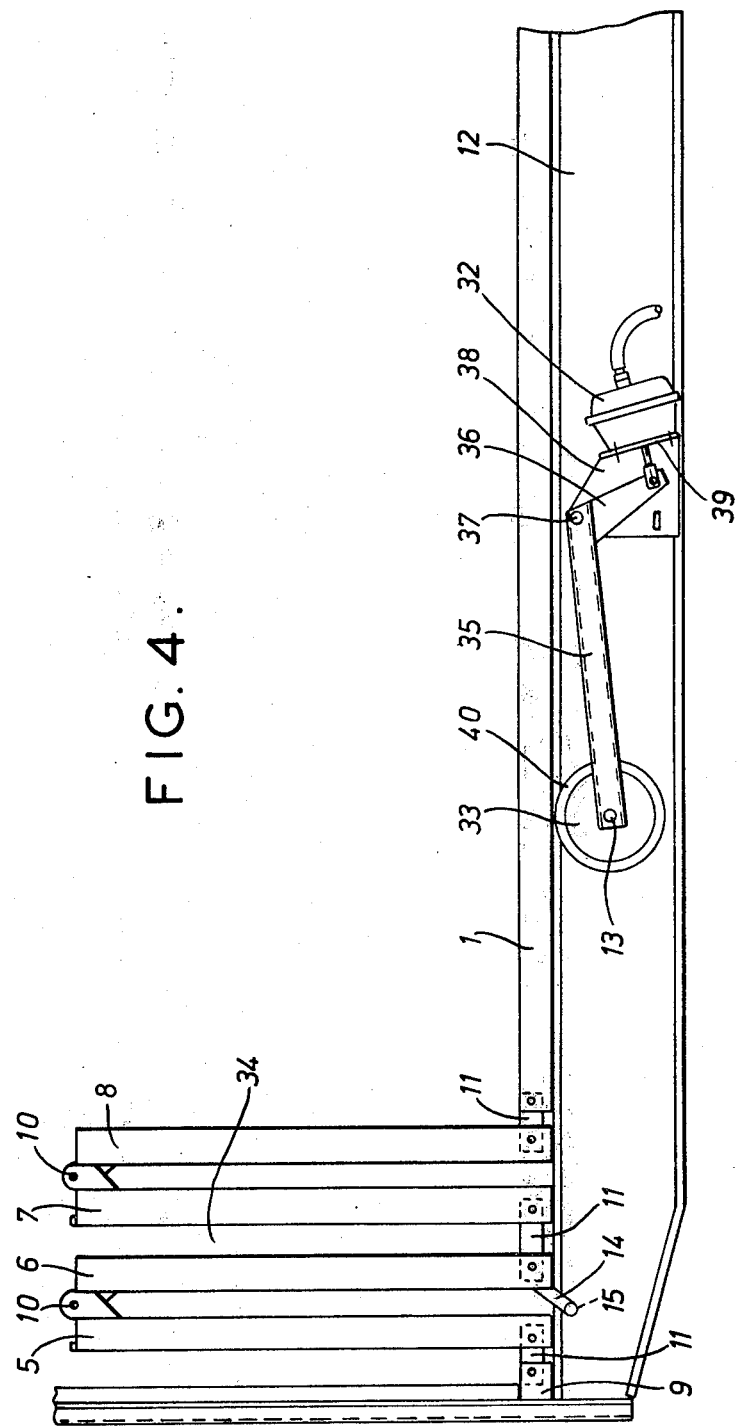
FIG. 4 shows the floor of the front platform section in the folded position.

The trailer 3 shown in FIG. 1 consists of a rear load-carrying platform section 1 and a front load-carrying platform section 4 carried on longitudinal chassis girders 12 and side members 22. The rear platform section 1 can slide in the direction of the longitudinal axis of the trailer by means of known devices (not shown) operating within a longitudinal channel 2 on the underside. The front platform section 4 is arranged to fold into platform subsections 5, 6, 7 and 8 which fold together when the rear platform section slides forward. Platform subsections 5-8 are linked together by hinge joints 10 and 11, and are also connected by articulated joints to a front fixed part 9 of the loading platform and to the rear sliding section 1 of the loading platform. When the front section 4 of the loading platform folds, some of the joints 10 will be raised, while other joints 11 remain in the same horizontal plane. These joints 11 are double joints with short link plates so that gaps 34 appear between the subsections in their folded position, and consequently any waste matter which has collected on the subsections can fall freely down between these joints without obstructing the folding of the subsections.

At its rear end, the platform subsection 6 has two downwardly and rearwardly extending guide lugs 14, each having a laterally projecting spigot 15. These engage with the upper flange of each chassis girder 12 so that guide lugs 14 locate platform subsection 6 laterally and spigots 15 prevent the rear end of the platform subsection with joint 11 from being lifted upwards. The rear platform section 1 has similar guide lugs 17 and spigots 15 to guide the motion of the rear platform section. The motion takes place along the chassis girders 12 and side members 22 upon slide plates 26. The side members and chassis girders are held together by cross-members 30.

To start the folding of platform subsections 5-8, the joint 10 nearest the front must be raised slightly to permit continued folding by means of an axial force in the direction of the longitudinal axis of the trailer. For this purpose, a small roller or wheel 33 is located just behind joint 10 between the most forward platform subsection 5 and the next most forward platform subsection 6 of the four-subsection front load-carrying platform section 4, and alongside one chassis girder 12 of the trailer roller 33 preferably has a running surface 40 of solid rubber or with a pneumatic tire. The roller 33 can rotate on a journal 13 at the free end of one arm 35 of a longitudinally-extending angled lever 35, 36. Lever 35, 36 can rotate on shaft 37, which is mounted on a bracket 38 fixed to the adjacent chassis girder 12. The other arm 36 is actuated by a servomotor 32 which is fixed to a flange 39 on the bracket 38. Servomotor 32 is arranged so that it brakes the lowering rate of the platform subsections as they straighten out.

The loading platform has side walls 18 and 19 which can be lowered. The side walls 18 of the front, folding section 1 of the loading platform are connected to side members 22 through intermediate pieces 21 by means of hinge joints 20 and 23. The intermediate pieces 21 have two projecting angled extensions, 24 and 31, along the lower and upper edges respectively which limit the range of movement of the adjacent joint. Extension 24 locates and maintains the intermediate piece 21 in a suitable position when side wall 18 is lowered (FIG. 5). Extension 31 locates the intermediate piece 21 vertical in alignment with the side wall 18 when the latter is raised (FIG. 6). The side walls 18 and 19 can be reinforced by means of special pillars 28, 27, which are connected to cross members 30 as at 29.

I claim:

1. An assembly for a long load carrying vehicle, said assembly comprising:
   (a) a loading surface means having a front part and a rear part and being disposed on a chassis,
   (b) said loading surface means including first and second portions,
   (c) said first portion being located in said rear part and slidably disposed to move in the direction of the longitudinal axis of the vehicle,
   (d) said second portion being located in said front part and hingedly connected on one outer edge to said first portion and on the other outer edge to said chassis,
   (e) said second portion having at least one pair of hinged sections effective to fold transversely to said longitudinal axis,
   (f) said second portion being effective to fold outwardly from said loading surface means when said first portion moves in a direction toward said second portion and to subsequently straighten out when said first portion moves in a direction away from said second portion.

2. An assembly as defined in claim 1 wherein the front second portion folds vertically upwardly with respect to said loading surface.

3. An assembly as defined in claim 1 wherein the loading surface means includes projections extending downwardly from the rear and front ends of said first portion,
said projections being shaped to engage members of said chassis and guide said first portion during movement of said first portion.

4. An assembly for a long load carrying vehicle, said assembly comprising:
 (a) a loading surface means disposed on a chassis,
 (b) said loading surface means including first and second portions,
 (c) said first portion being slidably disposed to move in the direction of the longitudinal axis of the vehicle,
 (d) said second portion being hingedly connected on one outer edge to said first portion and on the other outer edge to said chassis,
 (e) said second portion having at least one pair of hinged sections effective to fold transversely to said longitudinal axis,
 (f) said second portion being effective to fold outwardly from said loading surface means when said first portion moves in a direction toward said second portion and to subsequently straighten out when said first portion moves in a direction away from said second portion;
 (g) said second portion has a front hinged section and a rear hinged section,
 (h) said loading surface means includes projections being disposed on the rear of said rear hinged section,
 (i) said projections being angled downwardly and rearwardly and being effective to locate said rear hinged section laterally during folding and extension.

5. An assembly as defined in claim 4 wherein the chassis includes a longitudinally extending chassis member,
the lower end of each said projection includes a second projecting element directed sidewardly, inwardly and below said chassis member,
said projecting element being effective to prevent an adjacent sub-section interconnecting joint from being raised above the chassis member.

6. An assembly for a long load carrying vehicle, said assembly comprising:
 (a) a loading surface means disposed on a chassis,
 (b) said loading surface means including first and second portions,
 (c) said first portion being slidably disposed to move in the direction of the longitudinal axis of the vehicle,
 (d) said second portion being hingedly connected on one outer edge to said first portion and on the other outer edge to said chassis,
 (e) said second portion having at least one pair of hinged sections effective to fold transversely to said longitudinal axis,
 (f) said second portion being effective to fold outwardly from said loading surface means when said first portion moves in a direction toward said second portion and to subsequently straighten out when said first portion moves in a direction away from said second portion,
 (g) said loading surface means includes means pivotally attaching folding side panels to said second portion to be lowered at a limited angle of swing effective to provide clearance for side panels attached to the first portion to pass forward during movement of said first portion.

7. An assembly as defined in claim 6 wherein said pivotally attaching means includes link arms located adjacent an inner pivot mounting joint,
said link arms having an extension bent outwardly,
said extension being effective to engage against a stop so that its outward motion is limited when the link arm is swung outwardly.

8. An assembly as defined in claim 6 wherein said pivotally attaching means includes link arms each having an extension located at the upper end and above outer pivot joints,
each said extension being bent outwardly so that when the side panels connected thereto are folded up, the link arms pivot inwardly and are located in alignment in the vertical position.

9. An assembly for a long load carrying vehicle, said assembly comprising:
 (a) a loading surface means disposed on a chassis,
 (b) said loading surface means including first and second portions,
 (c) said first portion being hingedly connected on one outer edge to said first portion and on the other outer edge to said chassis,
 (d) said second portion being hingedly connected on one outer edge to said first portion and on the other outer edge to said chassis,
 (e) said second portion having at least one pair of hinged sections effective to fold transversely to said longitudinal axis,
 (f) said second portion being effective to fold outwardly from said loading surface means when said first portion moves in a direction toward said second portion and to subsequently straighten out when said first portion moves in a direction away from said second portion,
 (g) there are two pairs of hinged sections having pivot connecting joints therebetween to fold outwardly from said loading surface means into a folded position,
 (h) said connecting joints forming a gap between said hinged sections while in said folded position to allow waste matter that may have accumulated on the upper surface of the hinged sections to drop down through said gaps.

10. An assembly for a long load carrying vehicle, said assembly comprising:
 (a) a loading surface means disposed on a chassis,
 (b) said loading surface means including first and second portions,
 (c) said first portion being slidably disposed to move in the direction of the longitudinal axis of the vehicle,
 (d) said second portion being hingedly connected on one outer edge to said first portion and on the other outer edge to said chassis,
 (e) said second portion having at least one pair of hinged sections effective to fold transversely to said longitudinal axis, (f) said second portion being effective to fold outwardly from said loading surface means when said first portion moves in a direction toward said second portion and to subsequently straighten out when said first portion moves in a direction away from said second portion, (g) a lifting device is disposed on the chassis and includes joint lifting means located centrally below a connecting joint between a pair of hinged sections when in their extended straightened out condition, (h) said joint lifting means being effective to raise the connecting joint of the respective pair of hinged sections, and further being effective to support said hinged sections during the last stage of the straightening from a folded position.

11. An assembly as defined in claim 10 wherein said lifting device comprises roller means mounted to rotate at the free end of a horizontal arm of an angled lever.

12. An assembly as defined in claim 11 wherein said lifting device includes a servomotor connected to the free end of the downward and rearward angled arm of said angled lever.

13. An assembly as defined in claim 11 wherein the roller means includes a solid or pneumatic tire of elastomeric material.

14. A load-carrying trailer of a transport vehicle comprising:
 (a) a trailer chassis,
 (b) a load platform having front and rear sections,
 (c) said front section comprising a plurality of sub-sections and means interconnecting said sub-sections to permit folding together towards the front of the trailer to project outwardly from the load platform into a folded position,
 (d) means slidably mounting said rear section on said chassis for movement in the direction of the longitudinal axis of the trailer,
 (e) means for controlling the sliding movement of said rear section, whereby said front sub-sections fold together when the rear section moves forwardly and extend and straighten out when the rear section moves rearwardly,
 (f) said load platform being effective to facilitate loading and unloading by means of a crane with a relatively short jib carried by a towing vehicle at the front end of the trailer.

* * * * *